(12) United States Patent
Kitamura et al.

(10) Patent No.: US 8,137,421 B2
(45) Date of Patent: Mar. 20, 2012

(54) HYDROGEN GENERATION DEVICE, A FUEL CELL SYSTEM, AND AN ANALYSIS SYSTEM

(75) Inventors: Hideo Kitamura, Yokohama (JP); Yoshiyuki Isozaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1288 days.

(21) Appl. No.: 11/774,945

(22) Filed: Jul. 9, 2007

(65) Prior Publication Data

US 2008/0014483 A1  Jan. 17, 2008

(30) Foreign Application Priority Data

Jul. 11, 2006 (JP) ................ P2006-190689

(51) Int. Cl.
  B01J 7/00 (2006.01)
  B01J 8/00 (2006.01)
  H01M 8/06 (2006.01)
  C10J 3/54 (2006.01)
  C01B 6/24 (2006.01)
  C01B 3/02 (2006.01)

(52) U.S. Cl. ........ 48/61; 48/197 R; 423/644; 423/648.1; 422/625

(58) Field of Classification Search .......... 48/61, 197 R; 423/644, 648.1; 422/625

See application file for complete search history.

(56) References Cited

U.S. PATENT DOCUMENTS

| | | | |
|---|---|---|---|
| 2004/0197240 A1* | 10/2004 | Wheat et al. | 422/105 |
| 2005/0045226 A1* | 3/2005 | Abe | 137/75 |
| 2005/0136302 A1* | 6/2005 | Shoji et al. | 429/22 |
| 2005/0136304 A1* | 6/2005 | Pettit et al. | 429/26 |
| 2005/0202292 A1* | 9/2005 | Richards et al. | 429/22 |
| 2005/0217725 A1* | 10/2005 | Moore et al. | 137/75 |
| 2006/0133962 A1* | 6/2006 | Otani | 422/94 |

FOREIGN PATENT DOCUMENTS

| | | |
|---|---|---|
| JP | 58-161863 | 9/1983 |
| JP | 63-34425 | 2/1988 |
| JP | 8-222261 | 8/1996 |
| JP | 2004-319467 | 11/2004 |
| JP | 2005-158597 | 6/2005 |
| JP | 2006-179224 | 7/2006 |
| JP | 2006-253046 | 9/2006 |

* cited by examiner

*Primary Examiner* — Matthew Merkling
(74) *Attorney, Agent, or Firm* — Oblon, Spivak, McClelland, Maier & Neustadt, L.L.P.

(57) ABSTRACT

A hydrogen generation device includes a container; a hydrogen generation unit configured to generate a hydrogen-containing gas; a combustion unit configured to combust a part of the hydrogen-containing gas; a sensor unit including a thermal deformation member, configured to sense a concentration of a combustible gas in an exhaust gas by further combusting the exhaust gas and sensing a physical deformation of the thermal deformation member caused in a temperature change by the combustion of the exhaust gas; and a shutoff valve configured to shut off a discharge of the exhaust gas in conjunction with the physical deformation.

9 Claims, 13 Drawing Sheets

HYDROGEN GENERATION DEVICE, A FUEL CELL SYSTEM, AND AN ANALYSIS SYSTEM

CROSS REFERENCE TO RELATED APPLICATIONS AND INCORPORATION BY REFERENCE

This application is based upon and claims the benefit of priority from the prior Japanese Patent Application No. P2006-190689, filed on Jul. 11, 2006; the entire contents of which are incorporated herein by reference.

BACKGROUND OF THE INVENTION

1. Field of the Invention

The present invention relates to a hydrogen generation device, a fuel cell system and an analysis system.

2. Description of the Related Art

In recent years, development of new energy, which considers exhaustion of fossil fuel such as petroleum and an influence of the fossil fuel on the global environment, has been progressed. A technology for utilizing hydrogen energy among various types of energies has attracted attention, in which hydrogen is used in various purposes in industrial fields. Accordingly, development of a fuel cell system that reacts the hydrogen with oxygen and extracts electric energy by the reaction has been progressed. Particularly in recent years, expectations for a fuel cell system usable as a small power supply of a portable electronic instrument have been being increased.

In the case of using the fuel cell system as the small power supply, it is desirable to use, as fuel, not hydrogen gas itself but an organic material, such as dimethyl ether and methanol, having a high energy density. The reason for the above is as follows. In the case of using the hydrogen gas as the fuel of the small power supply drivable for a long time, the hydrogen gas must be compressed to several ten to several hundred atmospheric pressures in order to enhance the energy density. Accordingly, a fuel container must be formed into a heavy and large one in order to ensure strength thereof. Therefore, it is difficult to satisfy requirements that the portable electronic instrument be lightweight, thin, short, and small.

A fuel cell system is known, which uses the organic substance such as the dimethyl ether and the methanol in place of the hydrogen, generates the hydrogen in a reformer installed in the system, and drives the fuel cell by using the generated hydrogen (for example, refer to JP-A (KOKAI) No. 2004-319467.) It is necessary that unused hydrogen gas discharged from the fuel cell be subjected to catalytic combustion in a catalytic combustor, and not be discharged to the outside of the system.

However, in the system of JP-A (KOKAI) No. 2004-319467, when a catalyst in the catalytic combustor is deteriorated, the unused hydrogen gas is not burnt sufficiently and is continuously emitted to the outside of the device in some cases. Accordingly, in general, a safety device is additionally provided according to needs.

Meanwhile, a system is known, which detects abnormality of the catalytic combustor, such as the deterioration of the catalyst, by measuring a temperature in the catalytic combustor (for example, refer to JP-A (KOKAI) No. 2005-158597).

However, the system of JP-A (KOKAI) No. 2005-158597 additionally requires a measurement mechanism for measuring the temperature and an electronic mechanism for determining the abnormality based on the measurement temperature. Accordingly, the device becomes complicated and large, and it becomes difficult to achieve miniaturization of the device or the entirety of the system. Moreover, electric power for driving the measurement mechanism and the electronic mechanism is further required. Accordingly, energy efficiency of the system is decreased.

SUMMARY OF THE INVENTION

An aspect of the present invention inheres in a hydrogen generation device encompassing a container containing an organic raw material; a hydrogen generation unit configured to generate a hydrogen-containing gas from the organic raw material; a combustion unit configured to combust a part of the hydrogen-containing gas; a sensor unit including a thermal deformation member, configured to sense a concentration of a combustible gas in an exhaust gas exhausted from the combustion unit by further combusting the exhaust gas and sensing a physical deformation of the thermal deformation member caused in a temperature change by the combustion of the exhaust gas; and a shutoff valve configured to shut off a discharge of the exhaust gas in conjunction with the physical deformation.

Another aspect of the present invention inheres in a fuel cell system encompassing a container containing an organic raw material; a hydrogen generation unit configured to generate a hydrogen-containing gas from the organic raw material; a carbon monoxide removal unit configured to remove carbon monoxide from the hydrogen-containing gas; a power generation unit configured to generate electric power by reacting the hydrogen-containing gas from which the carbon monoxide is removed with oxygen; a combustion unit configured to combust an exhausted gas exhausted from the power generation unit; a sensor unit including a thermal deformation member, configured to sense a concentration of a combustible gas in an exhaust gas exhausted from the combustion unit by further combusting the exhaust gas and sensing a physical deformation of the thermal deformation member caused in a temperature change by the combustion of the exhaust gas; and a shutoff valve configured to shut off a discharge of the exhaust gas in conjunction with the physical deformation.

Still another aspect of the present invention inheres in an analysis system encompassing a hydrogen generation device including: a container containing an organic raw material; a hydrogen generation unit configured to generate a hydrogen-containing gas from the organic raw material; a carbon monoxide removal unit configured to remove carbon monoxide from the hydrogen-containing gas; a hydrogen purification unit configured to purify the hydrogen from the hydrogen-containing gas; a combustion unit configured to combust a part of the hydrogen-containing gas; a sensor unit, including a thermal deformation member, configured to sense a concentration of a combustible gas in an exhaust gas exhausted from the combustion unit by further combusting the exhaust gas and sensing a physical deformation of the thermal deformation member caused in a temperature change by the combustion of the exhaust gas; and a shutoff valve configure to shut off a discharge of the exhaust gas in conjunction with the physical deformation; and an analysis device configured to analyze a measurement target gas by using hydrogen purified in the hydrogen purification unit.

DETAILED DESCRIPTION OF THE INVENTION

Figure 1:
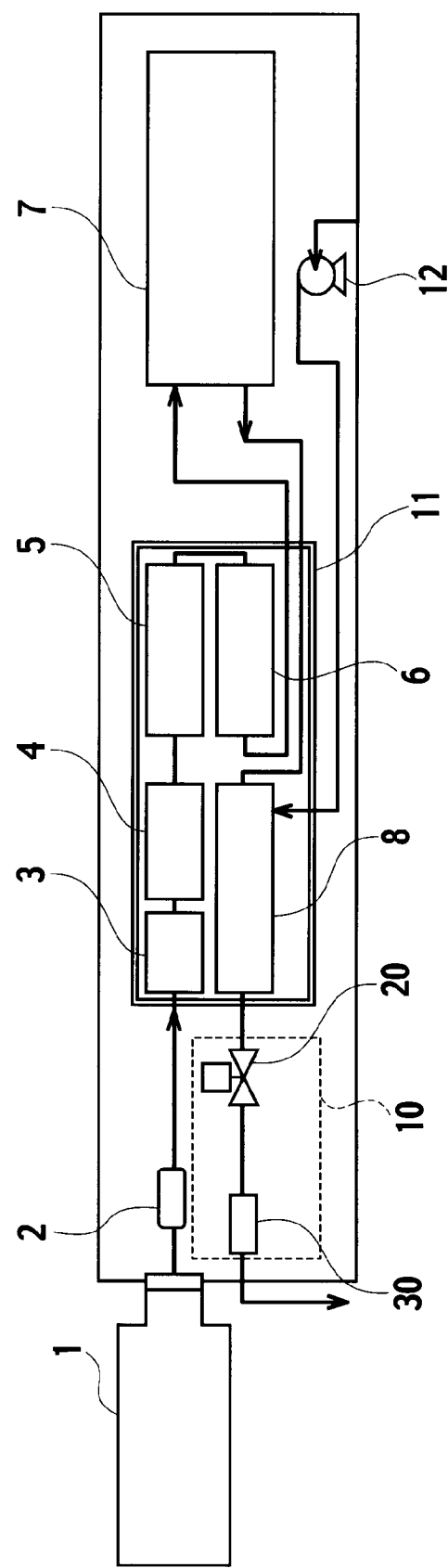
FIG. 1 is a block diagram illustrating an example of an overall structure of a hydrogen generation device (fuel cell system) according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. In the following descriptions, numerous details are set forth such as specific signal values, etc. to provide a thorough understanding of the present invention. However, it will be obvious to those skilled in the art that the present invention may be practiced without such specific details.

In the first and second embodiments, a hydrogen generation device is illustrated. The hydrogen generation device generates hydrogen from an organic material such as ethanol and dimethyl ether, uses the generated hydrogen for various purposes such as power generation and gas analysis, and thereafter, suppresses gas containing unused hydrogen from being discharged to the outside of the device. For the above-described functions, for example, the hydrogen generation device as shown in FIG. 1 includes a container 1 that contains the organic raw material, a hydrogen generation unit 4 that generates the hydrogen-containing gas from the organic raw material, a combustion unit 8 that partially combusts the hydrogen-containing gas, a sensor unit 30 that further burns exhaust gas discharged from the combustion unit 8, and senses a concentration of combustible gas in the exhaust gas by means of physical deformation thereof by a temperature change by the combustion, and a shutoff valve 20 that shuts off the discharge of the exhaust gas in conjunction with the physical deformation.

Here, the first embodiment illustrates the case of using the hydrogen generation device for a fuel cell system. The second embodiment illustrates the case of using the hydrogen generation device for an analysis system.

(First Embodiment)

-Hydrogen Generation Device (Fuel Cell System)-

As shown in FIG. 1, the fuel cell system (the hydrogen generation device) according to the first embodiment includes the container 1, that contains fuel including the organic raw material, the hydrogen generation unit (a reformer unit) 4 that generates the hydrogen-containing gas from the organic material, a carbon monoxide removal unit (a CO shift unit) 5 that removes carbon monoxide from the hydrogen-containing gas, a power generation unit (a fuel cell) 7 that reacts, with oxygen, the hydrogen-containing gas from which the carbon monoxide is removed and generates electric power, the combustion unit 8 that combusts the exhaust gas discharged from the fuel cell 7, a sensor unit 30 that further burns the exhaust gas discharged from the combustion unit 8, and senses the concentration of the combustible gas in the exhaust gas by means of the physical deformation thereof by the temperature change by the combustion, and the shutoff valve 20 that shuts off supply of the exhaust gas to the sensor unit 30 in conjunction with the physical deformation. Note that the "physical deformation" refers to a change of physical quantity, such as melting of a substance, a change of a volume, a change of a shape, and a change of a length.

As the organic raw material in the container 1, alcohol such as methanol and ethanol is usable. In the case of using the methanol as the organic material, it is preferable that a molar ratio of the methanol and water be from about 1:1 to about 1:2.

Liquefied gas of the dimethyl ether or the like is also usable as the organic raw material in the container 1. A saturation vapor pressure of the dimethyl ether at room temperature is approximately 6 atmospheric pressures, which is higher than the atmospheric pressure, in terms of the absolute pressure. Accordingly, the fuel can be fed to a vaporizer unit 3 to be described later by using the pressure of the fuel itself even without using a pump. The dimethyl ether and the water may be mixed in a pipe that communicates with the vaporizer unit 3 or in the vaporizer unit 3 without being mixed in the container 1, or alternatively, may be mixed in the container 1 in advance.

In order to advance the reforming reaction of the dimethyl ether to the hydrogen more efficiently, it is recommended that a quantity of the water be made larger than a stoichiometric quantity thereof. Accordingly, it is preferable that a molar ratio of the dimethyl ether and the water, which are supplied to the vaporizer unit 3, be from about 1:3 to about 1:4. At around the room temperature (25° C.), the dimethyl ether is dissolved into the water only in a molar ratio of approximately 1:7. However, the methanol is added to a mixture of the dimethyl ether and the water, whereby compatibility of the dimethyl ether with the water is enhanced, and a liquid phase of a mixed solution thus prepared becomes a uniform phase when the mixed solution is housed in the container 1. Hence, it is desirable to use a solution in which the methanol is added in a weight ratio of about 5% to about 10% to the mixture of the dimethyl ether and the water.

Even if the methanol is added to the mixture of the dimethyl ether and the water, a saturation vapor pressure of approximately 3 to 5 atmospheric pressures can be obtained as a pressure of the mixture itself at the room temperature. As the liquefied gas for use besides the above, there are mentioned propane, isobutane, normal butane, and the like. A saturation vapor pressure of each of these substances at the room temperature is higher than the atmospheric pressure.

The container 1 is connected to a flow rate control unit 2 through the pipe or the like. The flow rate control unit 2 controls a flow rate of the fuel fed from the container 1. For example, in the case of using the methanol as the organic material, a diaphragm pump, a plunger pump, a gear pump, a tube pump, and the like can be used as the flow rate control unit 2. In the case of using the dimethyl ether as the organic raw material, an orifice, a needle valve, a bellows valve, a diaphragm valve, a butterfly valve, and the like can be used as the flow rate control unit 2. As the flow rate control unit 2 besides the above, the one in which a plurality of the orifices having mutually different shapes are combined, an orifice of a temperature variable type, which changes viscosity of a fluid by adjusting a temperature thereof, thereby adjusting the flow rate, and the like can be used.

The fuel that has passed through the flow rate control unit 2 is fed to the vaporizer unit 3 through the pipe or the like. The vaporizer unit 3 heats up and vaporizes the fuel fed thereto from the container 1. The fuel vaporized by the vaporizer unit 3 is fed to the reformer unit 4 through a pipe or the like. In an inside of the reformer unit 4, a flow passage for flowing the vaporized fuel therethrough is provided. On an inner wall surface of the flow passage, a reforming catalyst for promoting the reforming reaction of the vaporized fuel to reformed gas is provided, where the fuel fed to the reformer unit 4 is reformed to the hydrogen-containing gas (the reformed gas).

The reformed gas generated in the reformer unit 4 is fed to the CO shift unit 5. In an inside of the CO shift unit 5, a flow passage for flowing the reformed gas therethrough is provided. On an inner wall surface of the flow passage, a shift catalyst for promoting a shift reaction of the carbon monoxide contained in the reformed gas is provided. The reformed gas fed to the CO shift unit contains, as byproducts, carbon dioxide, the carbon monoxide, and the like as well as the hydrogen. The carbon monoxide deteriorates an anode catalyst of the fuel cell 7, and decreases power generation performance of the fuel cell 7. Accordingly, the carbon monoxide contained in the reformed gas is subjected to the shift reaction to the carbon dioxide and the hydrogen in the CO shift unit 5, thus making it possible to reduce a quantity of the carbon monoxide in the reformed gas, and to increase a quantity of the generated hydrogen.

The reformed gas in which the carbon monoxide is reduced in the CO shift unit 5 is fed to a methanation unit 6 through a pipe or the like. The reformed gas fed from the CO shift unit 5 still contains approximately 1% to 2% of the carbon monoxide. Accordingly, in the methanation unit 6, a methanation reaction for converting the carbon monoxide that remains in the reformed gas into methane and the water is progressed, and the carbon monoxide is removed. In an inside of the methanation unit 6, a flow passage for flowing the reformed gas therethrough is provided. On an inner wall surface of the flow passage, there is provided a methanation catalyst for promoting the methanation reaction of the carbon monoxide contained in the reformed gas.

The reformed gas in the methanation unit 6 is fed to the fuel cell 7 through a pipe or the like. In the fuel cell 7, the hydrogen in the reformed gas and the oxygen in the atmosphere react with each other, thereby generating the water, and generating the electric power.

The exhaust gas discharged from the fuel cell 7 is fed to the combustion unit 8 through a pipe. The exhaust gas from the fuel cell 7 contains the combustible gas such as unreacted hydrogen and methane. In the combustion unit 8, the combustible gas is burnt by using the oxygen in the atmosphere injected thereto through an air pump 12. Combustion heat generated in the event of combustion is mainly used for heating up the vaporizer unit 3 and the reformer unit 4. For the purpose of increasing heating efficiency, equalizing the temperature, and protecting parts having low heat resistance, such as a peripheral electronic circuit, peripheries of the vaporizer unit 3, the reformer unit 4, the CO shift unit 5, the methanation unit 6, and the combustion unit 8 are covered with a heat insulating portion 11.

A shutoff unit 10 is provided on an outlet side of the combustion unit 8. The shutoff unit 10 includes the sensor unit 30, and the shutoff valve 20 disposed on an inlet side of the sensor unit 30. The sensor unit 30 burns, by the catalyst, the exhaust gas discharged from the combustion unit 8, and senses the concentration of the combustible gas in the exhaust gas by means of the physical deformation thereof caused by the temperature change by the combustion. The shutoff valve 20 shuts off the discharge of the exhaust gas to the sensor unit 30 in conjunction with the physical deformation caused by the temperature change by the combustion. An electromagnetic valve or a mechanical valve is usable as the shutoff valve 20. Details of the sensor unit 30 and the shutoff valve 20 will be described later.

The exhaust gas discharged into the combustion unit 8 passes through the shutoff valve 20 connected to the pipe or the like on the outlet side of the combustion unit 8, and is fed to the sensor unit 30 connected to the pipe or the like on the outlet side of the shutoff valve 20. In the sensor unit 30, the combustible gas contained in the exhaust gas is subjected to catalytic combustion, and is removed. The exhaust gas from which the combustible gas is removed is discharged to the outside of the fuel cell system of FIG. 1.

In accordance with the fuel cell system (the hydrogen generation device) according to the first embodiment, the combustible gas in the exhaust gas discharged from the combustion unit 8 is further burnt by the catalyst disposed in the sensor unit 30. When the concentration of the combustible gas in the exhaust gas is low, a temperature rise of the sensor unit 30 is small. Meanwhile, for example, when abnormality such as a deterioration of a combustion catalyst of the combustion unit 8 occurs, and the combustible gas in the combustion unit 8 is not thereby burnt sufficiently, the quantity of the exhaust gas subjected to the catalytic reaction in the sensor unit 30 is increased, and the temperature of the sensor unit 30 gradually rises. When the temperature of the sensor unit 30 rises more than a deformation temperature of a thermal deformation member, for example, when the temperature of the sensor unit 30 rises more than a melting point of the thermal deformation member built in the sensor unit 30 in the case where the thermal deformation is caused by melting, the thermal deformation member in the sensor unit 30 is deformed. The deformation of the thermal deformation member is transmitted to the shutoff valve 20, whereby the flow passage between the combustion unit 8 and the sensor unit 30 is automatically shutoff. Note that, though the case where an internal pressure of the fuel cell system shown in FIG. 1 rises excessively is considered, a method for adjusting the internal pressure will be described later.

In accordance with the fuel cell system according to the first embodiment, the emission of the unused hydrogen gas to the outside of the device can be easily suppressed by the physical change caused by the temperature change. Accordingly, a fuel cell system with high safety, which is also capable of realizing the miniaturization of the entirety of the device with a simple configuration, can be provided.

-Details of the Shutoff Unit 10 (In a Case Where the Shutoff Valve 20 is Electrically Driven)-

FIRST EXAMPLE

Figure 2:
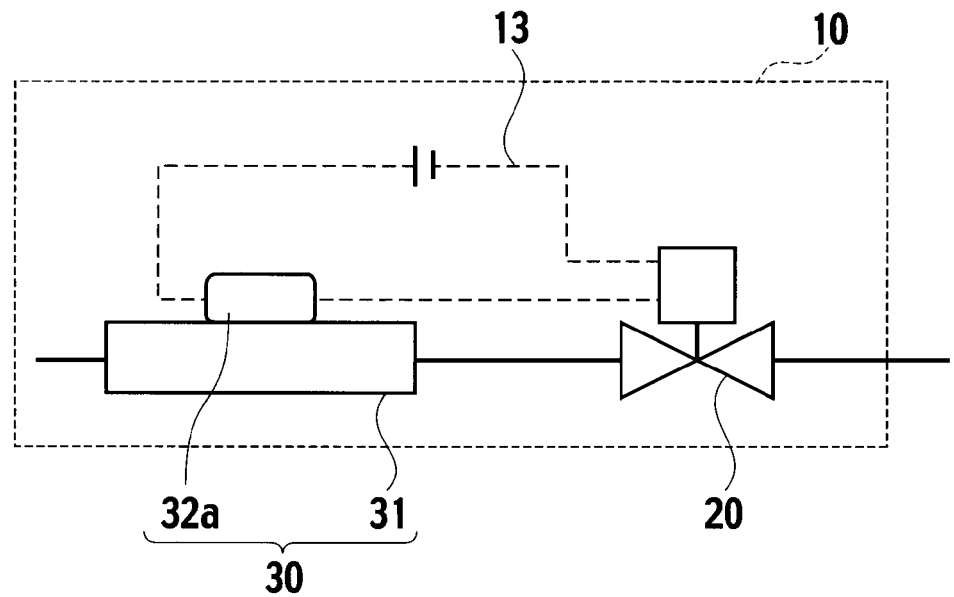
FIG. 2 is a pattern diagram illustrating a first example of a shutoff unit according to the first embodiment.

FIG. 2 shows an example of the case where the electromagnetic valve is used as the shutoff valve 20 of FIG. 1, and the shutoff valve 20 is electrically driven. The sensor unit 30 includes a sensing combustion unit 31 disposed on the flow passage on the outlet side of the combustion unit 8, and an automatic temperature adjustment and control device (a thermostat) 32a that is disposed on a surface of an outer wall of the sensing combustion unit 31, is physically deformed by the temperature change, and electrically controls an open/closed state of the shutoff valve 20.

In the thermostat 32a, a bimetal (not shown) built therein functions as the thermal deformation member. By disposing the bimetal, the thermostat 32a can be set in an OFF state when the temperature rises or in an ON state in that case. For example, in the case of using the thermostat 32a that turns to the OFF state when the temperature rises, the thermostat 32a is connected to the electromagnetic valve (the shutoff valve 20) of a normal close type by an electric circuit 13. When the thermostat 32a turns to the OFF state, and the electromagnetic valve is not energized, the electromagnetic valve turns to a closed state.

In the case of using the thermostat 32a that turns to the ON state when the temperature rises, the thermostat 32a is connected to the electromagnetic valve of a normal open type by the electric circuit 13. When the thermostat 32a turns to the ON state, and the electromagnetic valve (the shutoff valve 20) is energized, the electromagnetic valve turns to the closed state. Considering the discharge suppression of the combustible gas to the outside, it is desirable that the thermostat 32a of each of the above-described modes be formed into a structure that does not allow the shutoff valve 20 to be reset to an open state when the temperature drops.

Figure 4A:
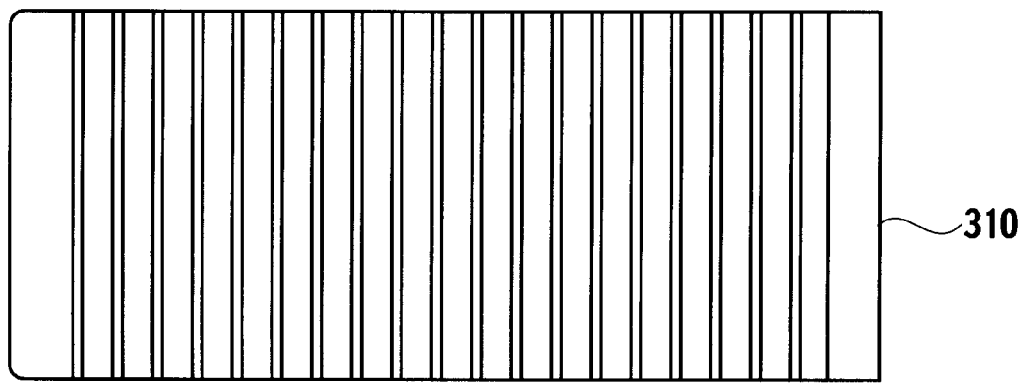
FIGS. 4A, 4B, and 4C are pattern diagrams illustrating en example of a sensing combustion unit shown in FIG. 2 and FIG. 3.
Figure 4B:
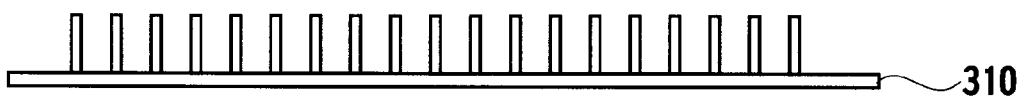
Figure 4C:
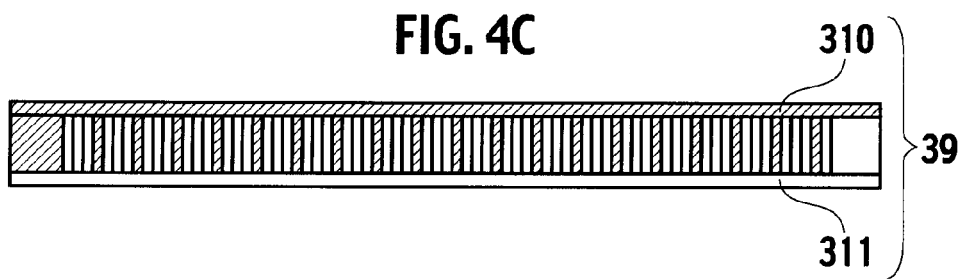

For example as shown in FIG. 4C, an aluminum-made microchannel reactor 39 can be used as the sensing combustion unit 31. The microchannel reactor 39 is fabricated in the following manner. As shown in FIG. 4A and FIG. 4B, a metal plate of aluminum or the like is machined to form a parallel channel 310. Then, the combustion catalyst is supported on a surface of the channel, and as shown in FIG. 4C, the parallel channel 310 is opposed to a parallel channel 311. The one in which the unit thus fabricated is sealed in an aluminum casing is usable as the sensing combustion unit 31. Aluminum that has high thermal conductivity is used as a material of the microchannel reactor 39, thus making it possible to transmit the generated combustion heat to the thermostat 32a rapidly and efficiently.

In accordance with the shutoff unit 10 shown in FIG. 2, the open/closed state of the shutoff unit 10 is electrically controlled in conjunction with the bimetal of the thermostat 32a, which is deformed in response to the temperature rise of the sensing combustion unit 31. Accordingly, in comparison with the conventional system that measures and analyzes the temperature change in the combustion unit 8 by an electronic mechanism, thereby sensing the abnormality, the discharge of the unreacted hydrogen gas to the outside can be suppressed effectively with a simpler configuration, thus making it possible to realize the miniaturization of the device.

SECOND EXAMPLE

Figure 3:
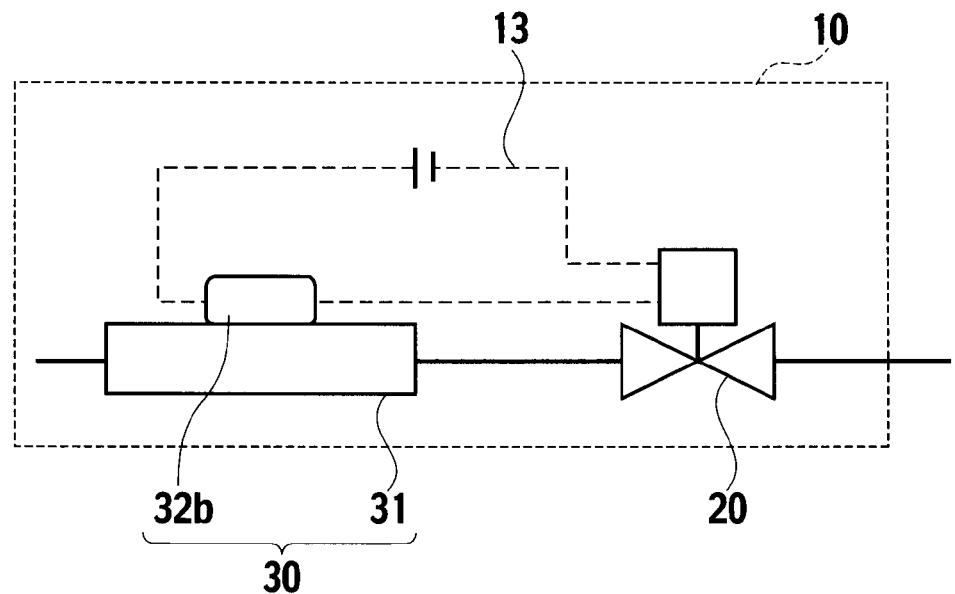
FIG. 3 is a pattern diagram illustrating a second example of a shutoff unit according to the first embodiment.

FIG. 3 shows another example of the case where the electromagnetic valve is used as the shutoff valve 20, and the shutoff valve 20 is electrically driven. The sensor unit 30 of the second example is similar to that of the first example in that the sensor unit 30 includes the sensing combustion unit 31 disposed on the flow passage on the outlet side of the combustion unit 8. However, in place of the thermostat 32a of the first example, the sensor unit 30 of the second example includes a temperature fuse 32b that is physically deformed by the temperature change, and electrically controls the open/closed state of the shutoff valve 20.

In the temperature fuse 32b, a low-melting-point metal disposed in an inside thereof functions as the thermal deformation member. By selecting a type of the low-melting-point metal, an operation temperature of the temperature fuse 32b can be changed. As for the low-melting-point metal, lead-tin (Pb—Sn), lead-silver (Pg—Ag), bismuth-tin (Bi—Sn), indium-bismuth-tin (In—Bi—Sn), lead-tin-silver (Pb—Sn—Ag), tin-copper (Sn—Cu), and the like may be usable.

As shown in FIG. 3, the temperature fuse 32b is connected to the electromagnetic valve (the shutoff valve 20) of the normal close type by the electric circuit 13. When the temperature fuse 32b turns to the OFF state, and the electromagnetic valve is not energized, the electromagnetic valve (the shutoff valve 20) turns to the closed state. The aluminum-made microchannel reactor 39 as shown in FIG. 4C can be used as the sensing combustion unit 31.

In accordance with the shutoff unit 10 shown in FIG. 3, the open/closed state of the shutoff unit 10 is electrically controlled in conjunction with the temperature fuse 32b in which a circuit is cut off by the temperature rise of the sensing combustion unit 31. The temperature fuse 32b does not allow the shutoff valve 20 to be reset to the open state even when the temperature drops. Accordingly, in comparison with the conventional system that measures and analyzes the temperature change in the combustion unit 8 by the electronic mechanism, thereby sensing the abnormality, the discharge of the unreacted hydrogen gas to the outside can be suppressed with a simpler configuration, and the miniaturization of the device can also be realized.

-Details of the Shutoff Unit 10 (In a Case Where the Shutoff Valve 20 is Mechanically Driven)-

FIRST EXAMPLE

Figure 5:
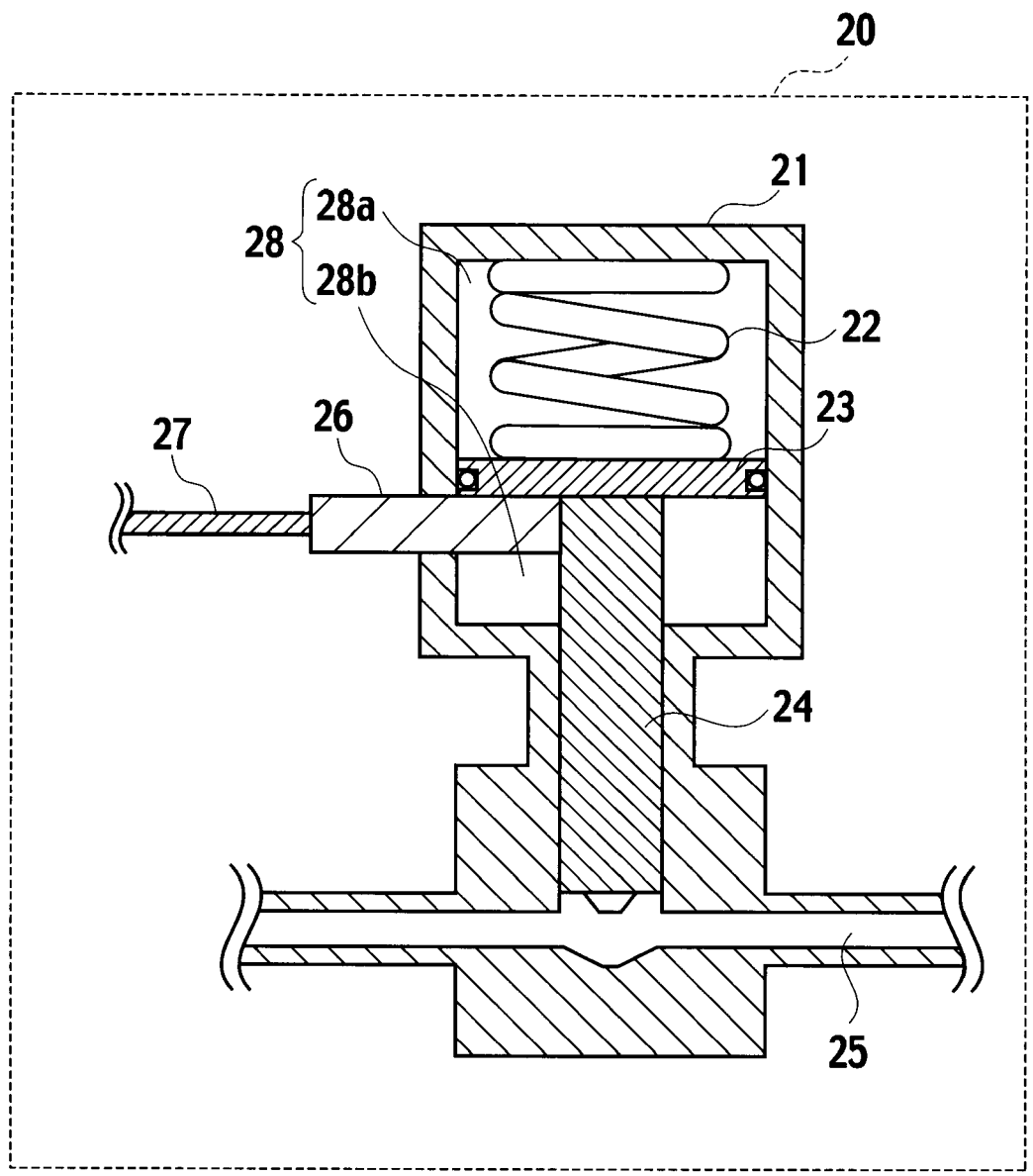
FIG. 5 is a cross-sectional view illustrating an example of a shutoff valve (mechanical valve) according to the first embodiment.
Figure 6:
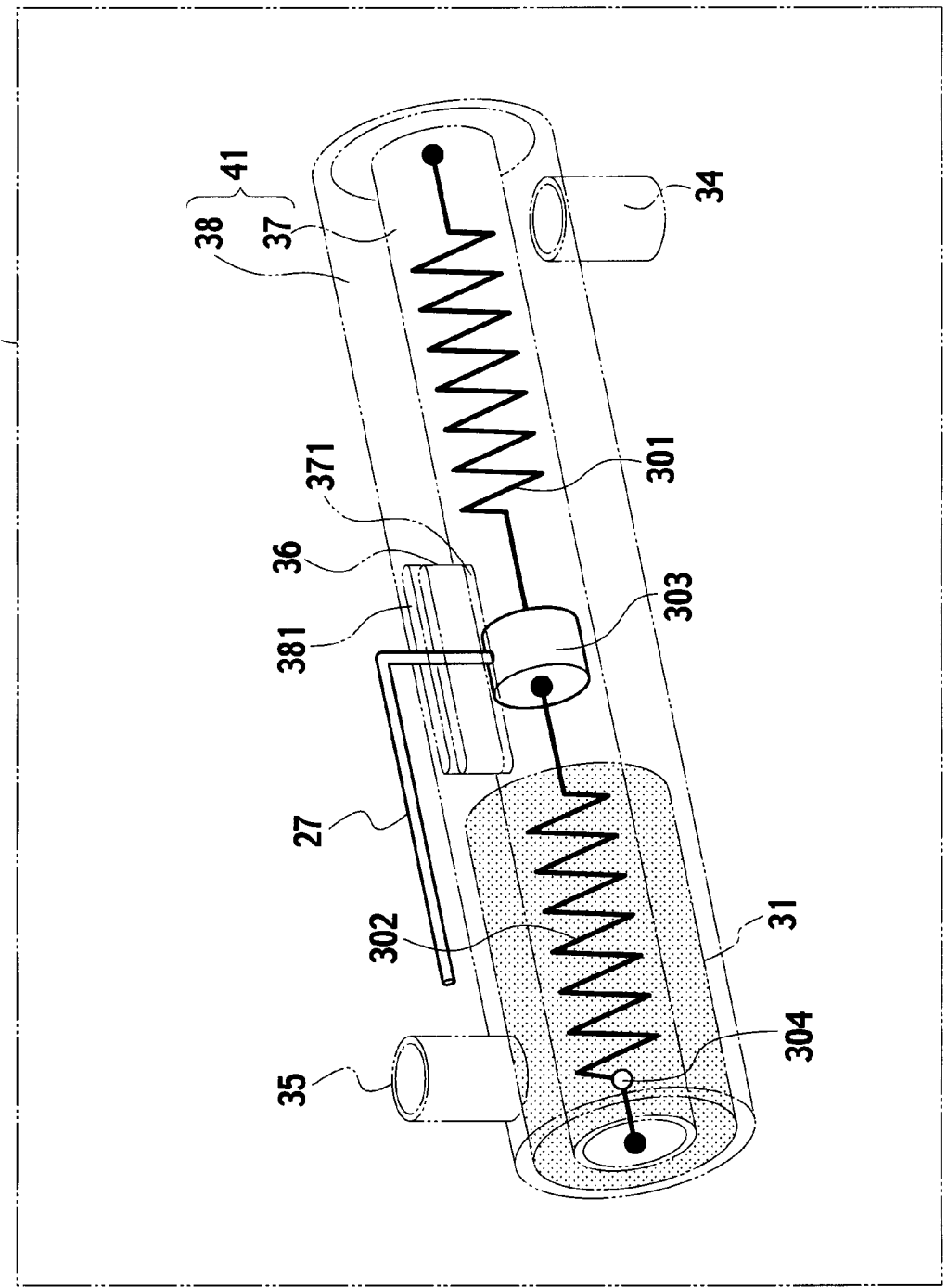
FIG. 6 is a perspective view illustrating a first example of a sensor unit according to the first embodiment.
Figure 7:
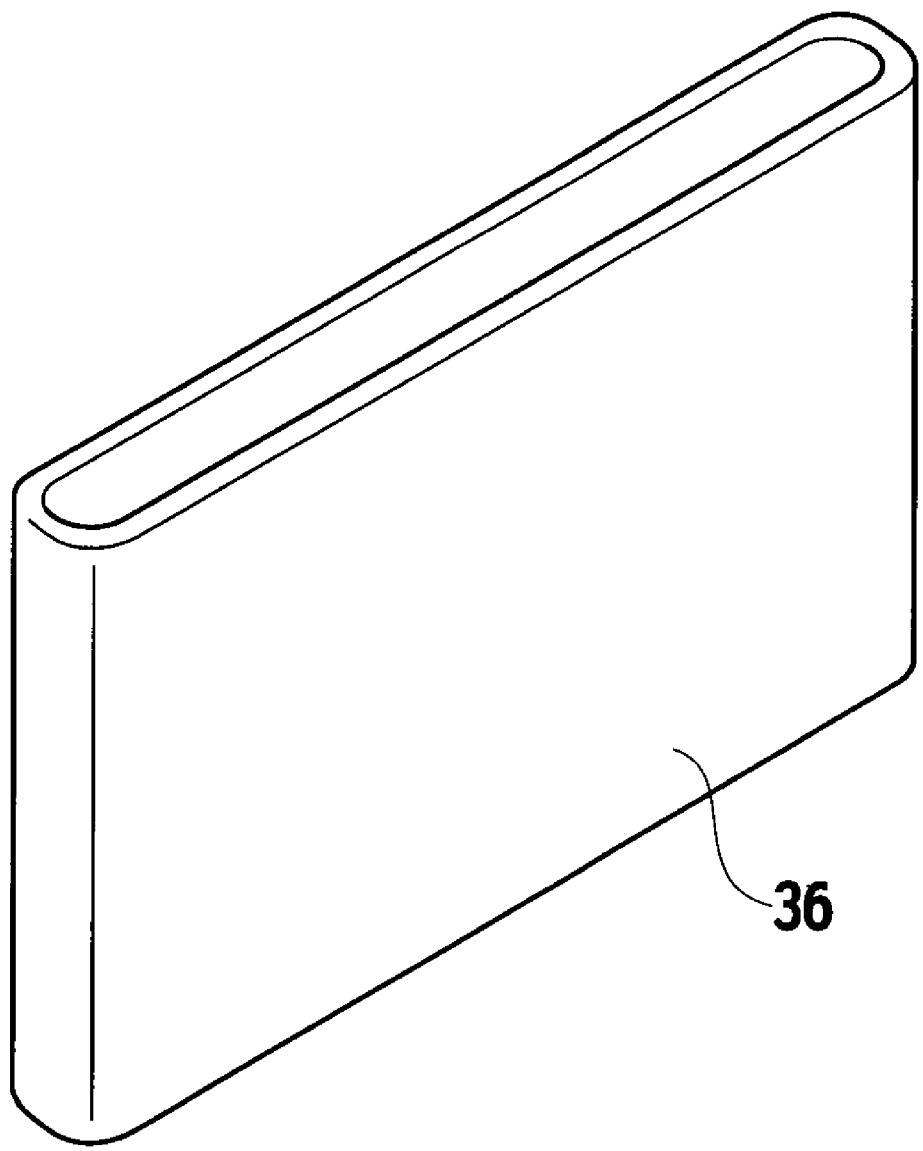
FIG. 7 is a perspective view illustrating a slit connection portion shown in FIG. 6.

FIG. 5 to FIG. 7 show an example (a first example) of the case where the mechanical valve is used as the shutoff valve 20 shown in FIG. 1, and the mechanical valve is mechanically controlled. As the shutoff valve 20, for example, a shutoff valve 20 as illustrated in a cross-sectional view of FIG. 5 is suitable.

In the shutoff valve 20 shown in FIG. 5, in an inner chamber 28 provided in an inside of a body 21 thereof, a diaphragm 23 for partitioning the inner chamber 28 into a first chamber 28a and a second chamber 28b is disposed. A spring 22 is housed in the first chamber 28a. A valve rod 24 fixed to the diaphragm 23 is disposed in the second chamber 28b. A tip end of the valve rod 24 is opposed to a flow passage 25 for feeding the exhaust gas therethrough.

A stopper 26 connected to a shutoff valve drive rod (control rod) 27 is fixed to the diaphragm 23. When the shutoff valve drive rod 27 is pulled to an outward direction of the body 21 by mechanical power by the deformation of the thermal deformation member to be described later, the stopper 26 is detached from the diaphragm 23, the diaphragm 23 moves to the flow passage 25 side by tension of the spring 22, and the flow passage 25 is shut off by the valve rod 24.

FIG. 6 shows an example of the sensor unit 30 suitable for the case of using the shutoff valve 20 shown in FIG. 5. The sensor unit 30 includes a sensor pipe 41 with a double-pipe structure composed of a cylindrical inner pipe 37 and a cylindrical outer pipe 38 that surrounds the inner pipe 37. Both end portions of the inner pipe 37 and the outer pipe 38 are hermetically sealed by disk-like members (not shown). On a side surface of the inner pipe 38, an exhaust gas inlet portion 34 and an exhaust gas outlet portion 35 are open. A gap between the inner pipe 37 and the outer pipe 38 becomes an exhaust gas passage for flowing the exhaust gas fed from the combustion unit 8 of FIG. 1 therethrough. The sensing combustion unit 31 is disposed in an inside of the exhaust gas passage. Into the sensing combustion unit 31, the solid combustion catalyst for burning the combustible gas is filled.

In an inside of the inner pipe 37, a thermal deformation member 304 adjacent to the sensing combustion unit 31, a first spring 302 connected to the thermal deformation member 304, a connection member 303 connected to the first spring 302, and a second spring 301 in which one end is connected to the connection member 303 and the other end is fixed to an end surface of the inner pipe 37, are arranged. The first and second springs 302 and 301 are individually fixed to the end surfaces of the inner pipe 37 in an extended state.

As the thermal deformation member 304, for example, low-melting-point metal (or alloy) such as Pb—Sn, Pg—Ag, Bi—Sn, In—Bi—Sn, Pb—Sn—Ag, and Sn—Cu is usable. By selecting a type of the low-melting-point metal, an operation temperature of the sensor unit 30 can be changed. It is possible to employ metal-made coil springs as the first and second springs 302 and 301.

On the side surfaces of the inner pipe 37 and the outer piper 38, an inner pipe slit 371 and an outer pipe slit 381 are formed, respectively. Between the inner pipe slit 371 and the outer pipe slit 381, a slit connection portion 36 that is tubular as shown in FIG. 7 is connected. One end of the slit connection portion 36 shown in FIG. 7 is fixed to the inner pipe slit 371 shown in FIG. 6 by welding or the like. The other end of the slit connection portion 36 of FIG. 7 is fixed to the outer pipe slit 381 shown in FIG. 6 by the welding or the like. Both ends of the slit connection portion 36 are fixed by the welding, whereby the exhaust gas that has flown into the sensor unit 30 from the exhaust gas inlet portion 34 flows out from the exhaust gas outlet portion 35 without leaking from the inner pipe slit 371 through the inside of the inner pipe 37 or leaking from the outer pipe slit 381 to the outside.

The shutoff valve drive rod (control rod) 27 is connected to the connection member 303 through the outer pipe slit 381 and the inner pipe slit 371. The shutoff valve drive rod 27 moves mechanically by extension and contraction of the second spring 301, which are caused by deformation of the thermal deformation member 304, and controls the open/closed state of the shutoff valve 20 shown in FIG. 5.

The exhaust gas that has flown from the exhaust gas inlet portion 34 of FIG. 6 into the sensor unit 30 flows through the exhaust gas passage present in the gap between the inner pipe 37 and the outer pipe 38, passes through the sensing combustion unit 31, and is discharged from the exhaust gas outlet portion 35. When the concentration of the combustible gas in the exhaust gas is increased, the thermal deformation member 304 is molten by the combustion heat generated in the sensing combustion unit 31. As a result, the second spring 301 contracts, and the connection member 303 and the shutoff valve drive rod 207 move to the exhaust gas inlet portion 34 side. The shutoff valve drive rod 27 of FIG. 6 moves, whereby the stopper 26 of FIG. 5 is pulled to the outside of the body 21. Accordingly, the flow passage 25 is shut off by the valve rod 24.

In accordance with the shutoff unit 10 shown in FIG. 5 to FIG. 7, the thermal deformation member 304 is molten in response to the temperature rise of the sensing combustion unit 31, whereby the second spring 301 shown in FIG. 6 contracts, and the shutoff valve drive rod 27 that interlocks with the second spring 301 moves mechanically. In such a way, the shutoff valve 20 shown in FIG. 5 shuts off the outlet-side flow passage of the combustion unit 8. In such a way, the fuel cell system that is capable of miniaturizing the entirety thereof and capable of suppressing the discharge of the unreacted hydrogen gas to the outside with a simple configuration can be provided.

SECOND EXAMPLE

Figure 8:
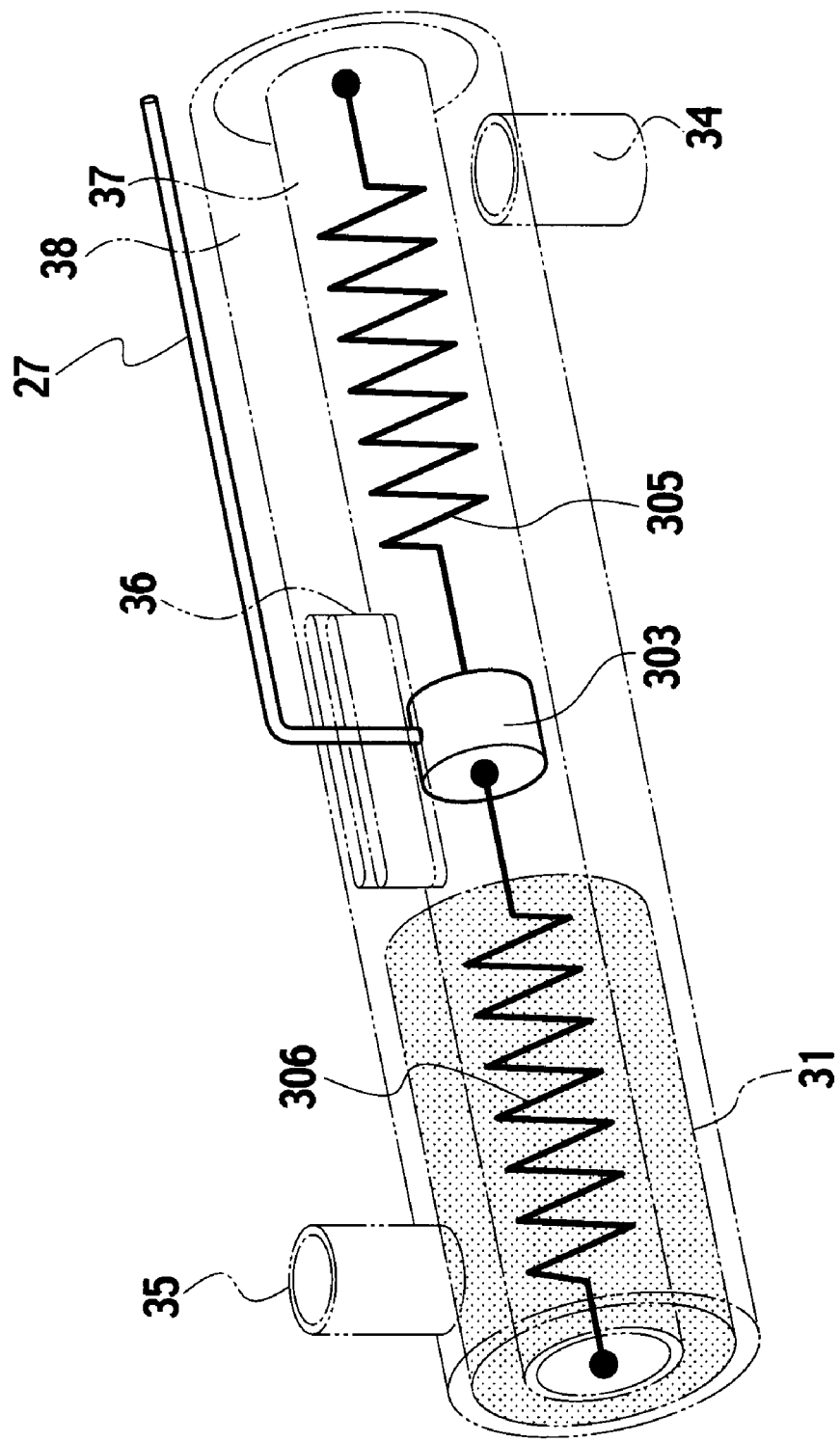
FIG. 8 is a perspective view illustrating a second example of a sensor unit according to the first embodiment.

FIG. 5 and FIG. 8 show another example (a second example) of the case where the shutoff of the flow passage in the shutoff unit 10 shown in FIG. 1 is mechanically performed. As the shutoff valve 20, the shutoff valve 20 as illustrated in the cross-sectional view of FIG. 5 is suitable.

As shown in FIG. 8, the sensor unit 30 includes the sensor pipe 41 having the inner pipe 37 and the outer pipe 38, between which the exhaust gas flow passage for flowing the exhaust gas therethrough is provided, the sensing combustion unit 31 disposed in the exhaust gas flow passage, a first spring (a first thermal deformation member) 306 adjacent to the sensing combustion unit 31 in the inside of the inner pipe 37, and a second spring 305 (a second thermal deformation member) similar to the second spring 301 of FIG. 6. The connection member 303 is connected to the other end of the first spring 306. One end of the second spring 305 is connected to the connection member 303, and the other end thereof is fixed to the end surface of the inner pipe 37. The shutoff valve drive rod 27 is connected to the connection member 303, and mechanically controls the open/closed state of the shutoff valve 20 by deformation of the first spring 306.

The respective end portions of the first and second springs 306 and 305 are fixed to the end surfaces of the inner pipe 37 in a state where the first and second springs 306 and 305 are extended. As the first spring 306, a shape memory alloy spring of a type that contracts when the temperature rises is suitable. By selecting a type of the shape memory alloy spring, the operation temperature can be changed.

The exhaust gas that has flown from the exhaust inlet portion 34 to the sensor unit 30 flows through the exhaust gas flow passage in the gap between the inner pipe 37 and the outer pipe 38, passes through the sensing combustion unit 31, and is then discharged from the exhaust gas outlet portion 35. When the concentration of the combustible gas in the exhaust gas is increased, the first spring 306 contracts by the combustion heat generated in the sensing combustion unit 31, and the connection member 303 moves to the exhaust gas outlet portion 35 side in conjunction with such contraction. In such a way, the shutoff valve drive rod 27 connected to the connection member 303 is driven, the stopper 26 shown in FIG. 5 is detached from the diaphragm 23, and the valve rod 24 shuts off the flow passage, thereby automatically stopping the flow of the exhaust gas. The first spring 306 as the thermal deformation member is deformed, whereby the shutoff valve 20 automatically shuts off the flow passage. Accordingly, in comparison with the system that calculates the temperature change in the combustion unit 8 by the electronic mechanism, thereby sensing the abnormality, or the like, it is possible to further miniaturize the entirety of the system, and the discharge of the unreacted hydrogen gas to the outside can be suppressed with a simpler configuration.

Note that, for both of the first spring 306 and the second spring 305, shape memory alloy springs having the same tension can be used. In such a way, the shutoff valve drive rod 27 can be actuated by using a difference in tension between both of the springs, which results from a temperature difference between the shape memory alloy springs. Accordingly, in comparison with the case of using the sensor unit 30 shown in FIG. 6, or only using the shape memory alloy spring for the first spring 306, this configuration described above has an advantage that a malfunction can be suppressed even when the temperature of the exhaust gas itself is high from the start and when the ambient environment temperature rises. Note that, in the case of using the shape memory alloy springs for both of the first spring 306 and the second spring 305, it is desirable that the connection member 303 be formed of a material having low thermal conductivity in order to suppress temperature equalization between the springs owing to thermal conduction from the first spring 306 to the second spring 305.

THIRD EXAMPLE

Figure 9:
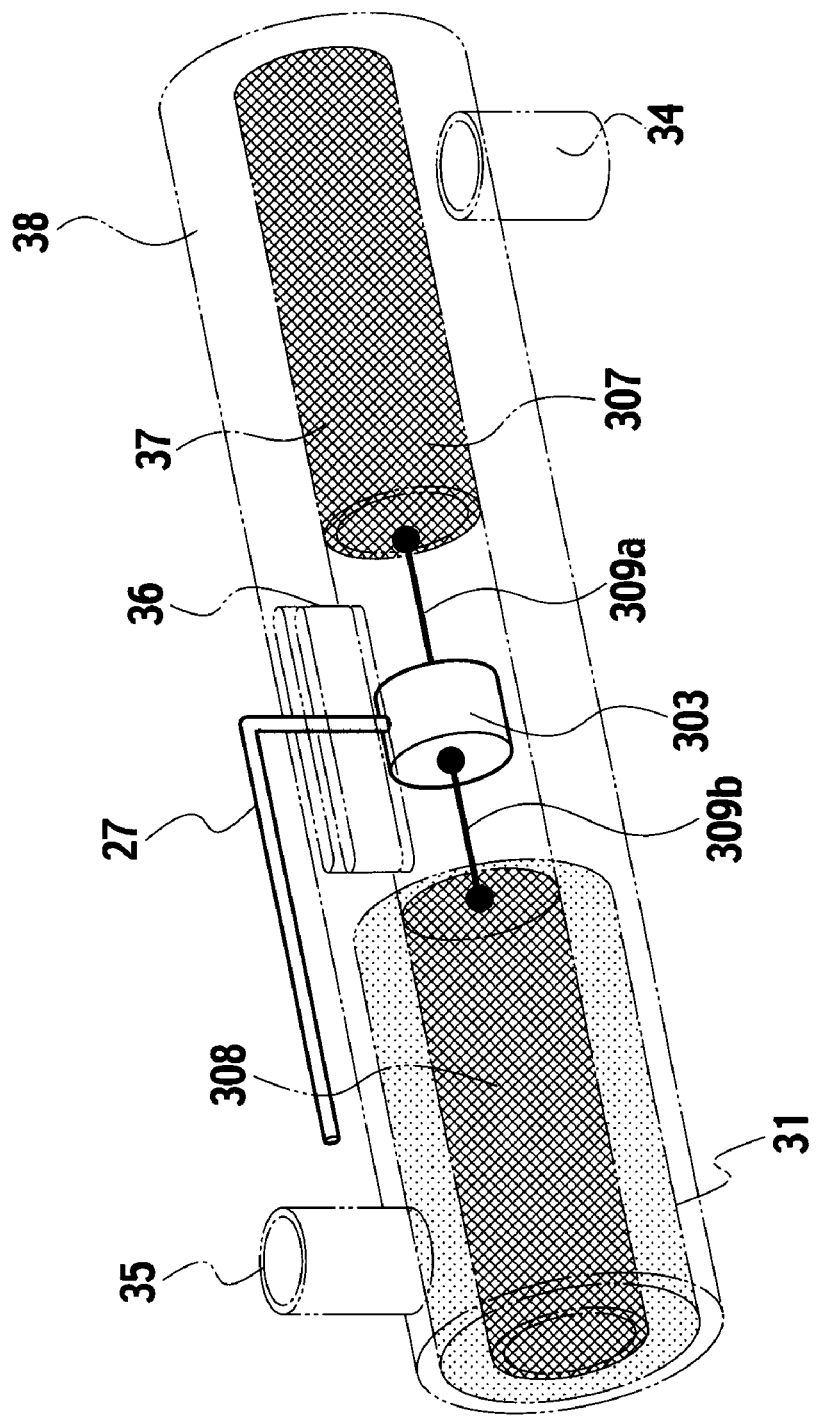
FIG. 9 is a perspective view illustrating a third example of a sensor unit according to the first embodiment.

FIG. 5 and FIG. 9 show still another example (a third example) of the case where the shutoff of the flow passage in the shutoff unit 10 shown in FIG. 1 is mechanically performed. As the shutoff valve 20, the shutoff valve 20 as illustrated in the cross-sectional view of FIG. 5 is suitable.

As shown in FIG. 9, in the sensor unit 30, a first gas-filled bag 308 adjacent to the sensing combustion unit 31 in the inside of the inner pipe 37, the connection member 303 connected to the first gas-filled bag 308, and a second gas-filled bag 307 connected to the connection member 303 are arranged. The first and second gas-filled bags 308 and 307 are connected to the connection member 303, for example, through wires 309a and 309b.

The first and second gas-filled bags 308 and 307 have flexibility, into the insides of which liquefied gas or compressed gas is filled. The dimethyl ether, chlorofluorocarbon, and the like are suitable as the liquefied gas. Carbon dioxide, nitrogen, and the like are suitable as the compressed gas. By selecting a type of the gas to be filled into the first and second gas-filled bags 308 and 307, the operation temperature of the sensor unit 30 can be changed.

The exhaust gas that has flown from the exhaust gas inlet portion 34 into the sensor unit 30 flows through the exhaust gas passage in the gap between the inner pipe 37 and the outer pipe 38, passes through the sensing combustion unit 31, and is then discharged from the exhaust gas outlet portion 35. When the concentration of the combustible gas in the exhaust gas is increased, the first gas-filled bag 308 is heated up by the combustion heat generated in the sensing combustion unit 31, and an internal pressure of the first gas-filled bag 308 is increased, whereby the first gas-filled bag 308 expands. As a result, the connection member 303 and the shutoff valve drive rod 27 move to the exhaust gas inlet portion 34 side. The shutoff valve drive rod 27 of FIG. 9 moves, whereby the stopper 26 of FIG. 5 is pulled to the outside of the body 21. Accordingly, the valve rod 24 shuts off the flow passage 25, thereby stopping the flow of the exhaust gas. Therefore, in comparison with the conventional system that calculates the temperature change in the combustion unit 8 by the electronic mechanism, thereby sensing the abnormality, it is possible to further miniaturize the entirety of the system, and the discharge of the unreacted hydrogen gas to the outside can be suppressed with a simpler configuration.

Moreover, in the third example shown in FIG. 9, the shutoff valve drive rod 27 is actuated by using a difference in internal pressure between the first and second gas-filled bags 308 and 307 which are the thermal deformation members. Accordingly, this configuration described above has the advantage that the malfunction can be prevented even when the temperature of the exhaust gas itself is high from the start and when the ambient environment temperature rises.
(First Modification of the First Embodiment)

Figure 10:
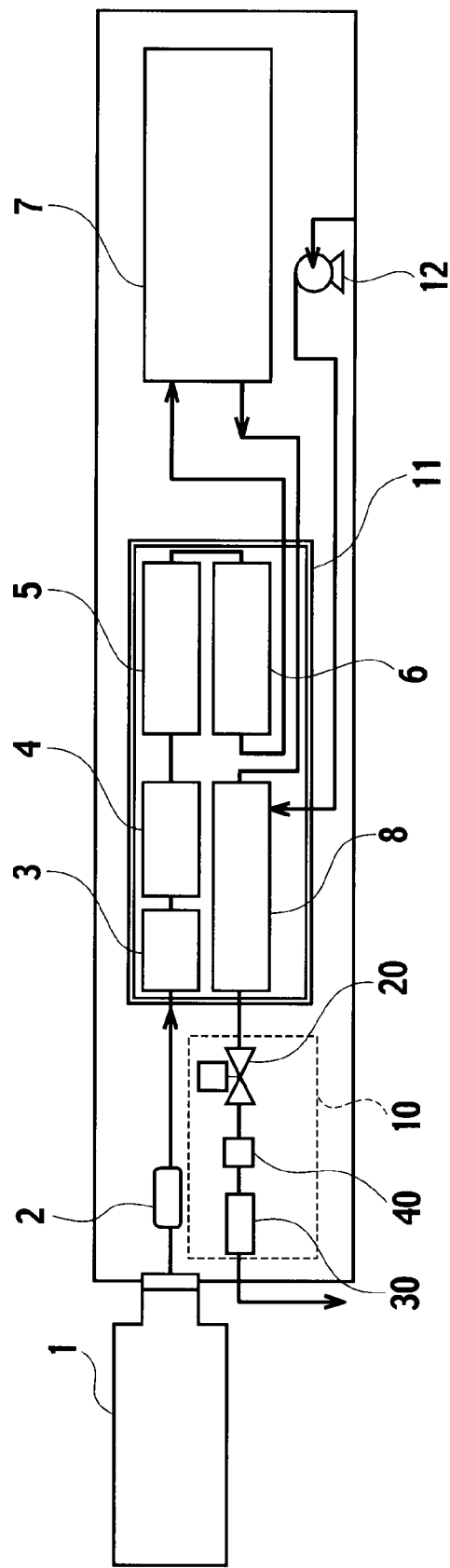
FIG. 10 is a block diagram illustrating an overall structure of a hydrogen generation device (fuel cell system) according to a first modification of the first embodiment.

As shown in FIG. 10, a fuel cell system according to a first modification is different from the fuel cell system shown in FIG. 1 in that the fuel cell system further includes an oxygen supply unit 40 that is disposed on the inlet side of the sensor unit 30, sucks oxygen (the air) necessary for the combustion from the outside of the flow passage to which the exhaust gas is supplied, and supplies the sucked oxygen to the sensor unit 30. The oxygen supply unit 40 is installed between the sensor unit 30 and the shutoff valve 20, and is connected to both by pipes or the like. For example, an ejector can be used as the oxygen supply unit 40. Others of the fuel cell system shown in FIG. 10 are substantially similar to those of the fuel cell system shown in FIG. 1, and accordingly, a duplicate description will be omitted.

In accordance with the fuel cell system shown in FIG. 10, the oxygen supply unit 40 is disposed, and the oxygen in the air is always supplied to the sensor unit 30. In such a way, for example, even when the air pump 12 that supplies the air to the combustion unit 8 is broken down, the shutoff valve 20 operates appropriately, and the inside of the system can be hermetically sealed. Accordingly, the safety is enhanced.
(Second Modification of the First Embodiment)

Figure 11:
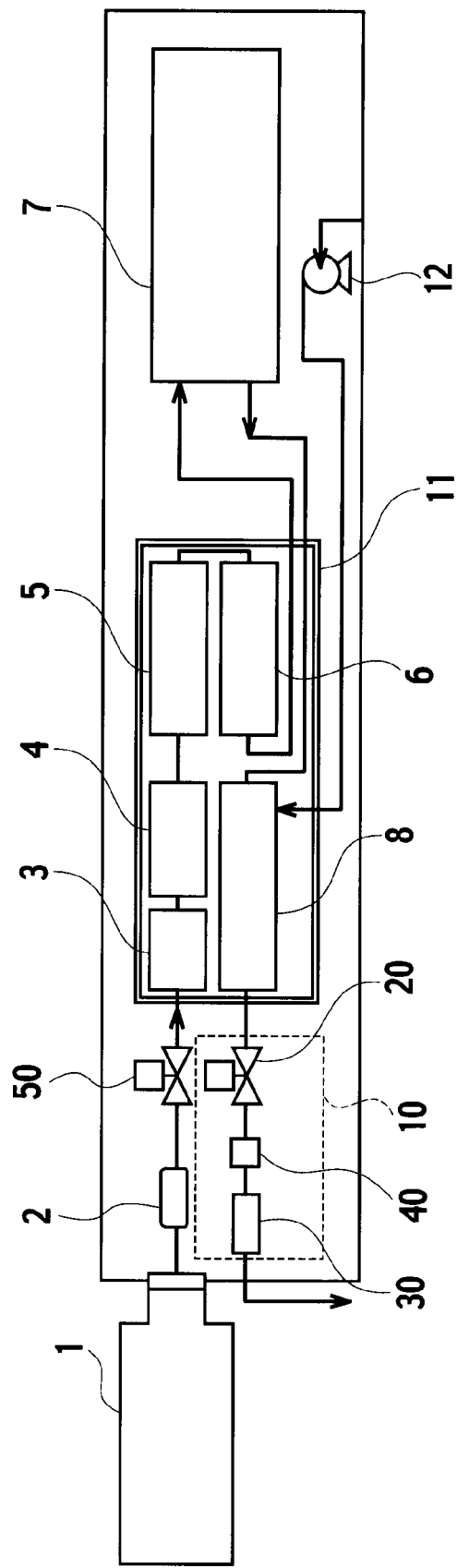
FIG. 11 is a block diagram illustrating an overall structure of a hydrogen generation device (fuel cell system) according to a second modification of the first embodiment.

As shown in FIG. 11, a fuel cell system according to a second modification further includes an inlet-side shutoff valve 50 disposed on the inlet side of the vaporizer unit 3. The inlet-side shutoff valve 50 is connected to the flow rate control unit 2 and the vaporizer unit 3 by pipes or the like.

If the oxygen keeps on being supplied by using the liquid pump (flow rate control unit 2) when the shutoff valve 20 operates owing to the deterioration of the combustion catalyst of the combustion unit 8 and the breakdown of the liquid pump 12, then there is a possibility that the internal pressure of the system may be increased to a limit pressure of the ejection. Moreover, if methanol is used as fuel and the oxygen keeps on being supplied by using the air pump 12 when the shut off valve 20 operates, there is a possibility that internal pressure of the system may be increased due to the air feed from the air pump 12. Furthermore, if the liquefied gas is used as the fuel, and is supplied by using the flow rate control unit 2 such as the orifice, then there is a possibility that the internal pressure of the system may be increased to the saturation vapor pressure intrinsic to the fuel. Accordingly, the internal pressure of the system may be increased more than that at the time of a normal operation. Accordingly, the inlet-side shutoff valve 50 is installed, and when the shutoff valve 20 operates, the inlet-side shutoff valve 50 is also operated to stop the fuel supply to the reformer unit 4, thus making it possible to suppress the internal pressure of the system from being increased.

Here, when the transmission of the deformation generation in the thermal deformation member by the sensor unit 30, which is shown in FIG. 11, is an electrical one as shown in FIG. 2 and FIG. 3, an electromagnetic valve having a similar configuration to that of the shutoff valve 20 can be used as the inlet-side shutoff valve 50. In this case, if the breakdown of the air pump 12 is not the cause of the operation of the shutoff valve 20, then there is a possibility that the inner pressure of the system may be increased to a limit of the air pump 12. Accordingly, it is desirable that an electromagnetic valve be further disposed on the inlet side or outlet side of the air pump 12, and be operated in conjunction with the operations of the shutoff valve 20 and the inlet-side shutoff valve 50. Alternatively, with regard to the structure of the air pump 12, the supply of the electric power to the air pump 12 may be stopped at the same time when the electromagnetic vales, which are the shutoff valve 20 and the inlet-side shutoff valve 50, start to be operated.

Figure 12:
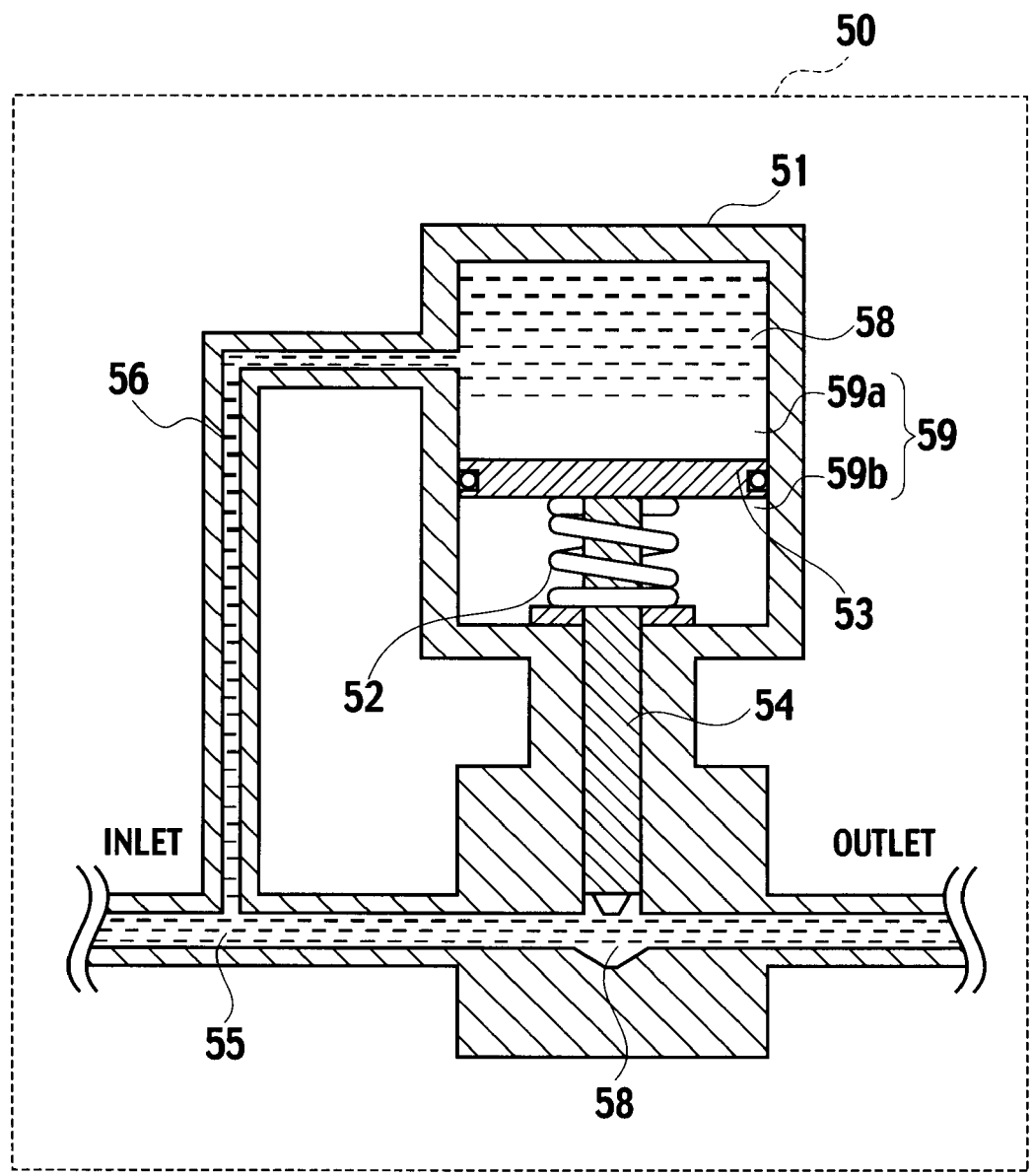
FIG. 12 is a cross-sectional view illustrating detailed structure of an inlet-side shutoff valve shown in FIG. 11.

Moreover, when the transmission of the deformation generation in the thermal deformation member by the sensor unit 30 is a mechanical one as shown in FIG. 5 to FIG. 9, for example, an inlet-side shutoff valve 50 as shown in a cross-sectional view of FIG. 12 is suitable. In the inlet-side shutoff valve 50 shown in FIG. 12, in an inner chamber 59 provided in an inside of a body 51 thereof, a diaphragm 53 for partitioning the inner chamber 59 into a first chamber 59a and a second chamber 59b is disposed. A spring 52 is housed in the second chamber 59b. A valve rod 54 fixed to the diaphragm 53 is disposed in the second chamber 59b. A tip end of the valve rod 54 is opposed to a flow passage 55 for feeding fuel 58 therethrough. A spring constant of the spring 52 is set at an extent where the valve rod 54 shuts off the flow passage 55 when the pressure of the fuel is increased more than that at the time of the normal operation.

An inlet side of the flow passage 55 is connected to the flow rate control unit 2 and the container 1 through a pipe or the like. On the inlet side of the flow passage 55, a branch passage 56 connected to the first chamber 59a is disposed. The fuel fed from the container 1 shown in FIG. 11 passes through the flow rate control unit 2, and passes through the flow passage 55 of FIG. 12. At this time, a part of the fuel is fed as valve-driving fuel to the first chamber 59a through the branch passage 56.

When the pressure of the fuel is increased more than that at the time of the normal operation, force of the fuel, which is applied to the diaphragm 53 from the first chamber 59a side, is increased more than that at the time of the normal operation. The force further compresses the spring 52 present on the second chamber 59b side, and moves the valve rod 54 connected to the diaphragm 53 downward, thereby shutting the flow passage of the fuel. By changing the spring constant of the spring 52 and a length of the valve rod 54, the internal pressure of the system in the case where the flow passage is shut off can be set. As a type of the spring 52, a coil spring, a plate spring, an air spring, and the like can be used.

Note that, if the breakdown of the air pump 12 is not the cause of the operation of the shutoff valve 20, then there is a possibility that the inner pressure of the system may be increased to the limit of the air pump 12. Accordingly, it is desirable that the inlet-side shutoff valve 50 as shown in FIG. 12 be also disposed on the outlet side of the air pump 12. Meanwhile, if the breakdown of the air pump 12 is the cause of the operation of the shutoff valve 20, there is a possibility that the hydrogen-containing gas may flow back from the combustion unit 8 to the air pump 12 side depending on the structure of the air pump 12. In order to prevent such backflow, it is desirable to further install a check valve and the like on the outlet side of the air pump 12.

If the structure of the air pump 12 is a structure in which the backflow does not occur unless the pressure on the outlet side is increased to a certain value, then it is also possible to install the inlet-side shutoff valve 50 as shown in FIG. 12 on the outlet side of the air pump 12. If the air pump 12 for use has a structure that easily flows back the gas, then it is desirable to install both of the inlet-side shutoff valve 50 as shown in FIG. 12 and the check valve. If the air pump 12 has a structure that does not flow back the gas when the pressure is not increased to a certain value, only the inlet-side shutoff valve 50 as shown in FIG. 12 just needs to be installed. Others of the fuel cell system shown in FIG. 11 are substantially similar to those of the fuel cell system shown in FIG. 10, and accordingly, a duplicate description will be omitted.

In accordance with the fuel cell system shown in FIG. 11 and FIG. 12, the inlet-side shutoff valve 50 is disposed, thus making it possible to suppress the increase of the internal pressures of the reformer unit 4 and the like. Accordingly, the safety is enhanced.

(Third Modification of the First Embodiment)

Figure 13:
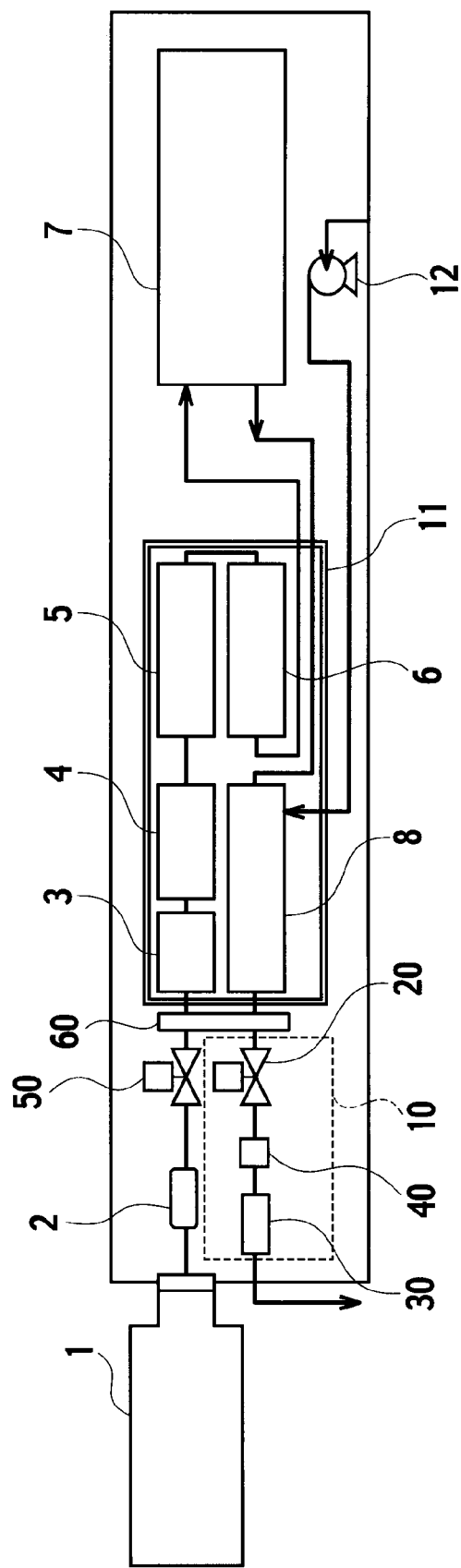
FIG. 13 is a block diagram illustrating an overall structure of a hydrogen generation device (fuel cell system) according to a third modification of the first embodiment.

As shown in FIG. 13, a fuel cell system according to a third modification example further includes a heat exchanger unit 60 that is disposed on the outlet side of the combustion unit 8, and exchanges thermal energy of the exhaust gas with thermal energy of the organic material fed to the vaporizer unit 3.

The heat exchanger unit 60 is disposed between the pipe on the inlet side of the vaporizer 3 and the pipe on the outlet side of the combustion unit 8. As a material of the heat exchanger unit 60, it is desirable to use a material, such as aluminum, having high thermal conductivity. The heat exchanger unit 60 gives the thermal energy owned by the exhaust gas, which is from the combustion unit 8, through the heat exchanger unit 60 itself to the fuel that has passed through the pipe on the inlet side of the vaporizer unit 3, thereby cooling the exhaust gas flowing through the outlet side of the combustion unit 8. Others of the fuel cell system shown in FIG. 13 are substantially similar to those of the fuel cell system shown in FIG. 12, and accordingly, a duplicate description will be omitted.

In accordance with the fuel cell system shown in FIG. 13, the temperature of the exhaust gas fed to the shutoff unit 10 can be reduced, and accordingly, the malfunction of the shutoff unit 10, which may be caused by the excessive temperature rise of the exhaust gas in the combustion unit 8, can be prevented.

(Second Embodiment)

Figure 14:
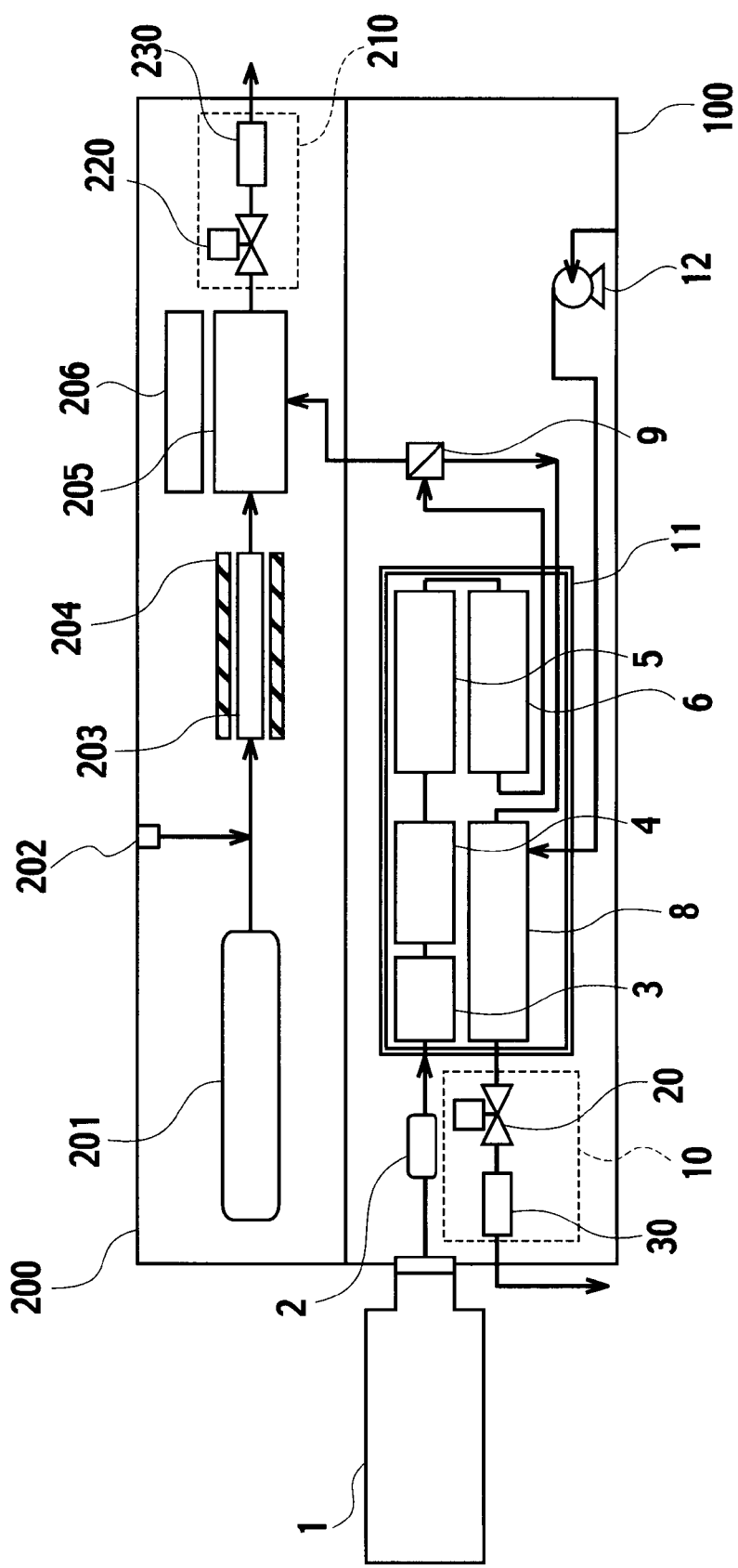
FIG. 14 is a block diagram illustrating an overall structure of a hydrogen generation device (analysis system) according to a second embodiment.

As shown in FIG. 14, an analysis system according to the second embodiment includes a hydrogen generation device 100 having a hydrogen purification unit 9 that purifies the hydrogen from the hydrogen-containing gas generated in the reformer unit 4; and an analysis device 200 that analyzes measurement target gas by using the hydrogen purified in the hydrogen purification unit 9.

The hydrogen purification unit 9 is connected to an outlet side of the methanation unit 6 through a pipe. The hydrogen purification unit 9 separates the reformed gas, from which the carbon monoxide is removed, into high-concentration hydrogen gas from which the methane, the carbon dioxide, vapor, and the like are removed and low-concentration hydrogen gas containing the methane, the carbon dioxide, the vapor, and the like. As the hydrogen purification unit 9, for example, a hydrogen permeation membrane made of a metal film of palladium, vanadium, tantalum, or the like, and a quartz hydrogen-permeation semipermeable membrane can be used. The low-concentration hydrogen gas generated in the hydrogen purification unit 9 is fed to the combustion unit 8 through a pipe or like. The high-concentration hydrogen gas is fed to the analysis device 200 through a pipe or the like.

The analysis device 200 includes a carrier gas holder unit 201, a column 203 connected to the carrier gas holder unit 201 through a pipe or the like, a flame ionization detector (FID) 205 connected to the column 203 through a pipe or the like, and a shutoff unit 210 connected to the FID 205 through a pipe or the like.

In the carrier gas holder unit 201, inert gas such as helium and nitrogen is held. On the pipe on an outlet side of the carrier gas holder unit 201, a measurement target gas supply port 202 is disposed. The measurement target gas is supplied from the measurement target gas supply port 202, and is fed to the column 203 together with a flow of the inert gas fed from the carrier gas holder unit 201.

The column 203 separates the gas, which is fed thereto through the pipe or the like, into each of gas components. The column 203 is warmed up to a predetermined temperature by an electric heater 204 disposed on a circumference of the column 203 itself. As a device for heating the column 203, it is not always necessary to use the electric heater 204. For example, a part of the heat generated in the hydrogen generation device 100 may be supplied to the column 203 by using a heat pipe. A capillary column, a packed column, or the like is usable as the column 203.

The gases subjected to the component separation in the column 203 are fed to the FID 205 through the pipe or the like. The FID 205 burns the gasses fed thereto from the column 203 together with the high-concentration hydrogen gas supplied from the hydrogen purification unit 9, and ionizes the measurement target gas. The FID 205 is controlled by an analysis control unit 206.

It is possible to supply, from a secondary battery or the like, electric power necessary to drive the FID 205, the analysis control unit 206, the electric heater 204, and the like. However, the following configuration may be adopted, in which the fuel cell 7 as shown in FIG. 1 is installed on the outlet side of the hydrogen purification unit 9, the fuel cell 7 is driven by the supply of the low-concentration hydrogen gas from the hydrogen purification unit 9, and electric energy extracted by driving the fuel cell 7 is used as the electric power.

The measurement target gas that has turned to the carbon dioxide and the vapor as a result of decomposition in the FID 205 and the exhaust gas containing the vapor generated by the combustion of the high-concentration hydrogen gas are fed to the shutoff unit 210 connected to the FID 205 through the pipe or the like. The shutoff unit 210 includes a shutoff valve 220, and a sensor unit 230. A configuration of the shutoff unit 210 is substantially similar to that of the shutoff unit 10 described in the first embodiment, and accordingly, a description thereof will be omitted.

In accordance with the analysis system according to the second embodiment, when the concentration of the hydrogen in the exhaust gas flowing into the sensor unit 230 is increased more than that at the time of the normal operation owing to a failure of the combustion in the FID 205, the thermal deformation member is deformed by the combustion heat generated in the sensing combustion unit disposed in the sensor unit 230, and such deformation is transmitted to the sensor unit 230, whereby the shutoff valve 220 operates to shut off the flow passage. In such a way, an analysis system with high safety, which is capable of suppressing the emission of the hydrogen gas to the outside, can be provided.

(Other Embodiments)

Various modifications will become possible for those skilled in the art after receiving the teachings of the present disclosure without departing from the scope thereof.

The modification examples of the first embodiment, which are shown in FIG. 10 to FIG. 13, show examples of sequentially adding the oxygen supply unit 40, the inlet-side shutoff valve 50, and the heat exchanger unit 60 to the fuel cell system shown in FIG. 1. However, it is naturally possible to singly add each of the oxygen supply unit 40, the inlet-side shutoff valve 50, and the heat exchanger unit 60. Moreover, it is also possible to use a fuel cell system in which the oxygen supply unit 40, the inlet-side shutoff valve 50, and the heat exchanger unit 60 are combined arbitrarily. Naturally, it is also possible to incorporate the oxygen supply unit 40, the inlet-side shutoff valve 50, and the heat exchanger unit 60, which are shown in FIG. 10 to FIG. 13, into the hydrogen generation device 100 shown in the second embodiment, and to use a system fabricated in such a way as a portable analysis instrument.

What is claimed is:

1. A hydrogen generation device comprising:
a container containing an organic raw material;
a hydrogen generation unit configured to generate a hydrogen-containing gas from the organic raw material;
a combustion unit configured to combust a part of the hydrogen-containing gas;
a sensor unit including a thermal deformation member, configured to sense a concentration of a combustible gas in an exhaust gas exhausted from the combustion unit by further combusting the exhaust gas and sensing a physical deformation of the thermal deformation member caused in a temperature change by the combustion of the exhaust gas; and
a shutoff valve configured to shut off a discharge of the exhaust gas in conjunction with the physical deformation.

2. The device of claim 1, wherein the sensor unit further includes:
a sensing combustion unit provided with an outlet side of a flow passage of the combustion unit,
wherein a thermostat or a temperature fuse, serving as the thermal deformation member, disposed on a surface of an outer wall of the sensing combustion unit, electrically control open and closed states of the shutoff valve.

3. The device of claim 1, wherein the sensor unit further includes:
a sensor pipe including an inner pipe, an outer pipe surrounding the inner pipe so as to provide an exhaust gas passage between the inner pipe and the outer pipe, facilitating a flow of the exhaust gas exhausted from the combustion unit;
a sensing combustion unit disposed in the exhaust gas passage;
a first spring connected to the thermal deformation member;
a connection member connected to the first spring;
a second spring in which one end is connected to the connection member and another end is fixed to an end surface of the inner pipe; and
a control rod connected to the connection member, mechanically moving by expansion and contraction of the second spring caused by a deformation of the thermal deformation member, and controlling open and closed states of the shutoff valve,
wherein the thermal deformation member is disposed adjacent to the sensing combustion unit at an inner side of the inner pipe.

4. The device of claim 1, wherein the thermal deformation member is divided into first and second thermal deformation members aligned along one direction,
the sensor unit further includes:
a sensor pipe including an inner pipe, an outer pipe surrounding the inner pipe so as to provide an exhaust gas passage between the inner pipe and the outer pipe, facilitating a flow of the exhaust gas, one end of the first thermal deformation member is fixed to one end surface of the inner pipe, one end of the second thermal deformation member is fixed to another end surface of the inner pipe;
a sensing combustion unit disposed adjacent to the first deformation member in the exhaust gas passage;
a connection member connected between another ends of the first and second thermal deformation members; and
a control rod connected to the connection member, mechanically controlling open and closed states of the shutoff valve by a deformation of the first and second thermal deformation members.

5. The device of claim 4, wherein the first and second thermal deformation members include shape memory alloy springs or gas-filled bags having flexibility.

6. The device of claim 1, further comprising an oxygen supply unit provided with an inlet side of the sensor unit, supplying oxygen necessary for the combustion of the exhaust gas from the outside of the flow passage to which the exhaust gas is supplied to the sensor unit.

7. The device of claim 1, further comprising an inlet-side shutoff valve provided with an inlet side of the vaporizer unit, shutting off a supply of the organic raw material to the hydrogen generation unit in conjunction with the temperature change.

8. The device of claim 1, further comprising a heat exchanger unit disposed on an outlet side of the combustion unit, exchanging thermal energy of the exhaust gas exhausted from the combustion unit with thermal energy of the organic raw material passing through an inlet-side of the hydrogen generation unit.

9. The device of claim 1, further comprising an inlet-side shutoff valve provided with the inlet side of the vaporizer unit, shutting off a supply of the organic raw material to the hydrogen generation unit in conjunction with a pressure of an inlet-side of the hydrogen generation unit.

* * * * *